(12) United States Patent
Eronen

(10) Patent No.: US 6,723,032 B2
(45) Date of Patent: Apr. 20, 2004

(54) SEGMENTED ROLL

(75) Inventor: Pekka Eronen, Järvenpää (FI)

(73) Assignee: Metso Paper, Inc., Helsinki (FI)

( * ) Notice: Subject to any disclaimer, the term of this patent is extended or adjusted under 35 U.S.C. 154(b) by 90 days.

(21) Appl. No.: 09/957,266

(22) Filed: Sep. 20, 2001

(65) Prior Publication Data

US 2002/0042332 A1 Apr. 11, 2002

Related U.S. Application Data

(63) Continuation of application No. PCT/FI00/00230, filed on Mar. 21, 2000.

(30) Foreign Application Priority Data

Mar. 22, 1999 (FI) .................................... 990633

(51) Int. Cl.$^7$ .............................................. F16C 13/00
(52) U.S. Cl. ............................ 492/45; 492/20; 492/40; 29/895.213
(58) Field of Search .......................... 492/40, 39, 45, 492/16, 20, 21; 29/895.2, 895.21, 895.22, 895.23, 895.213; 226/194, 191; 464/162, 169

(56) References Cited

U.S. PATENT DOCUMENTS

| 754,797 | A | * | 3/1904 | Istrander et al. ............... 26/103 |
| 3,648,342 | A | * | 3/1972 | Dorfel ......................... 492/15 |
| 3,745,625 | A | | 7/1973 | Jaegers et al. |
| 3,786,975 | A | * | 1/1974 | Heymanns .................. 226/194 |
| 4,010,528 | A | | 3/1977 | Böhmer |
| 4,222,433 | A | | 9/1980 | Marti et al. |
| 4,239,142 | A | | 12/1980 | Schönmeier et al. |
| 4,272,873 | A | | 6/1981 | Dietrich |
| 4,496,257 | A | * | 1/1985 | Habelt et al. ................ 400/578 |
| 5,471,859 | A | * | 12/1995 | Sendzimir et al. ............ 492/39 |
| 5,836,500 | A | | 11/1998 | Jourde |
| 6,042,525 | A | | 3/2000 | Rajaniemi |

FOREIGN PATENT DOCUMENTS

| EP | 0829654 A3 | 9/1998 |
| FI | 54165 | 10/1978 |
| FI | 62514 | 9/1982 |
| FI | 63079 | 12/1982 |
| FI | 103827 | 9/1999 |
| SE | 437509 | 3/1985 |
| WO | WO 00/56647 | 9/2000 |

* cited by examiner

Primary Examiner—I Cuda-Rosenbaum
Assistant Examiner—Marc Jimenez
(74) Attorney, Agent, or Firm—Stiennon & Stiennon

(57) ABSTRACT

A segmented roll has a plurality of end-to-end mounted roll segments (10, 10'), each adapted to rotate on bearings supported on a separate support shaft (11). In both axial end surfaces of the support shafts (11) of the roll segments (10) there are coupling means such as an annular projection and an annular recess serving to disengageably connect two adjacent roll segments (10) to each other. The support shaft (11) has at least two parts (16, 18) whose mutual disposition is made alterable for the purpose of altering the axial length of the support shaft (11) so much that the coupling means (29, 41) of the facing axial ends of two adjacent roll segments (10) can be engaged and disengaged with each other. This arrangement makes it possible to change a single roll segment from the central area of the segmented roll without the need for disassembling the entire row of roll segments.

23 Claims, 5 Drawing Sheets

SEGMENTED ROLL

CROSS REFERENCES TO RELATED APPLICATIONS

This application is a continuation of PCT application No. PCT/FI00/00230, filed Mar. 21, 2000, and claims priority on Finnish Application No. 990633, filed Mar. 22, 1999, the disclosures of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a segmented roll comprised of a plurality of end-to-end mounted roll segments, each adapted to rotate on bearings supported on a separate support shaft.

When desired, the bow of such a segmented roll can be changed by adjusting the position and/or distance of the support points of the individual roll segments in regard to their mounting frame, thus making the roll extremely suitable for use, e.g., as a spreader roll in conjunction with the handling of a web-like continuous sheet of material. The segmented roll is also suited for use, e.g., as a guide roll for a paper web or as a pressure roll in winding.

In conventional segmented roll constructions, each of the roll segments is generally journaled at its both ends on bearings which are supported on the segmented roll mounting frame or similar support framework. Frequently, two adjacent roll segments share one bearing unit. Then, removal of one roll segment from the central area of this kind of segmented roll may be difficult, because the segmented roll must be disassembled starting from one end in order to reach the roll segment to be replaced at the central area of the segmented roll.

From FI laid-open publication no. 62514 is known a spreader roll of the above-described type, wherein the respective abutting stub shafts of adjacent roll segments are adapted to be supported on a two-part support bearing block that determines the roll bow. Thus, each stub shaft is provided with a separate support bearing that is designed to function as a pivotal bearing point. The pivotal bearing points of the abutting stub shafts are adapted in close proximity to each other on the different sides of the support bearing, whereby each support bearing unit supports one of the adjacent pivotal bearing points. This kind of a two-part support bearing block makes it possible to dismount and replace separate roll segments without the need for complete disassembly of the entire spreader roll. On the other hand, such an arrangement places two bowing points at a small distance from each other thus causing nonuniform bowing of the roll. As the bowing point is not exactly at the mating point of the abutting roll segments, but rather, displaced by a small distance therefrom, the bend of the roll tends to lift up the end of the roll segment and thus makes the roll rotate bowed into a toothed shape. Hence, the correct geometry of roll bow is not attained which causes problems in controlling the web travel.

SUMMARY OF THE INVENTION

It is an object of the invention to provide a novel type of segmented roll in which all separate roll segments are dismountable and replaceable without the need for complete disassembly of the entire segmented roll and which segmented roll is capable of assuming a smooth bow.

The segmented roll according to the invention has coupling means adapted to both axial end surfaces of the support shafts of its roll segments, said coupling means serving to disengageably connect two adjacent roll segments to each other. The support shaft contains at least two parts such that changing the mutual disposition of said parts makes it possible to alter the axial length of the support shaft.

Advantageously, the coupling means on the support shaft end surfaces are such that allow a coupling to be established between two adjacent roll segments, the coupling being capable of accommodating an inclination between the longitudinal axes of the adjacent roll segments. The coupling means may contain a projection or the like on the end surface of the first roll segment and a mating recess on the end surface of the second roll segment. The projection can be formed, e.g., by an annular flange projection made to the end surface of the support shaft with a shape allowing limited rotation and inclination of the projection in a concentric annular recess made to the end surface of the adjacent roll segments when the adjacent roll segments are coupled to each other. Alternatively, one of the mating coupling surfaces may be formed by a concave hemispherical surface, whereby the mating end surface is formed by a convex hemispherical surface. In this arrangement for bowing the segmented roll to a desired curvedness, only one of the mating ends of the adjacent roll segments needs to be directly supported to the mounting frame, while support for the other end is provided by the end of the adjacent roll segment.

The support shaft of the roll segment is comprised of two parts adapted to be solidly, advantageously nonrotatably, lockable to each other with the help of a locking element. After the locking element is released, the shaft parts can be axially moved with respect to each other by a distance allowing the coupling means formed on the mating end surfaces of the abutting roll segments to be withdrawn apart from each other.

Advantageously, the first part of the support shaft includes an axial projection, most advantageously like a peg that is adapted to fit into an axial bore of the second part of the support shaft. The locking element can be a fastening member, advantageously a lock screw, placed into a radial hole made to one end of the support shaft, the tip of the locking element in its locking position being adapted to press against the outer circumference of the support shaft axial projection thus being capable of solidly locking both parts of the support shaft to each other.

Preferably, the lock screw or similar locking element also has another functional position. To this end, the length of the lock screw is advantageously made such that when the lock screw is turned away from resting against the outer circumference of the axial projection, the screw head will tuck against the inner circumference of the roll segment shell thus coupling the other part of the support shaft to follow a possible movement of the roll segment shell. The inner circumference of the roll segment shell is adavantageously provided with a recess suitable for assuring positive contact of the screw head with the roll segment shell when the roll segment is being rotated.

Advantageously, at least a portion of the axial projection part and the axial recess part connecting the abutting parts of the support shaft to each other have compatible outer and inner threads, respectively, made thereto. Thus, having first the locking means disengaged, it is possible with the help of the threaded portions to move one part of the support shaft by rotation thereof in regard to the other part in the axial direction.

Advantageously, the roll segment of the segmented roll according to the invention is comprised of an outer shell and an inner shell connected to each other by a disc portion. Both parts of the support shaft are provided with an annular recess opening toward the interior of the roll segment, said recesses being adapted to accommodate the tubular flange parts of the inner shell extending to both sides from said disc portion. Each roll segment is rotatably mounted on the support shaft preferably using two bearings, advantageously ball bearings, having their inner races fixed to the rotating inner shell of the roll segment and their outer races fixed to the inner surfaces of the outer walls of the annular recesses made to the support shaft.

Advantageously, the segmented roll comprises a plurality of roll segments having their support shafts mounted only at one end on the mounting frame of the segmented roll, complemented with one roll end segment having its both ends mounted on the mounting frame. The mounting arrangement of the support shaft end on the frame is advantageously such that allows the position on and/or distance of the roll segment end to be adjusted in regard to the mounting frame.

In a segmented roll embodiment according to the invention, it is possible to replace any single roll segment in the central area of the segmented roll without the need for complete disassembly of the entire segmented roll assembly. To this end, only one end of each roll segment is mounted on the segmented roll mounting frame, while the other end is supported on the adjacent roll segment by means of a coupling that can be disengaged through adjusting the support shaft of the roll segment to a shorter length.

As the bowing point between two adjacent roll segments is arranged to coincide with the mating plane of their ends, the segmented roll will bow evenly without any toothed jaggedness in its curvature. Hence, the segmented roll is unproblematically suited for supporting a web, for instance.

BRIEF DESCRIPTION OF THE DRAWINGS

In the following the invention will be described by way of an example with reference to the appended drawings, whereby the details thereof are not understood to limit the scope of the invention, in which diagrams

DESCRIPTION OF THE PREFERRED EMBODIMENTS

Figure 1:
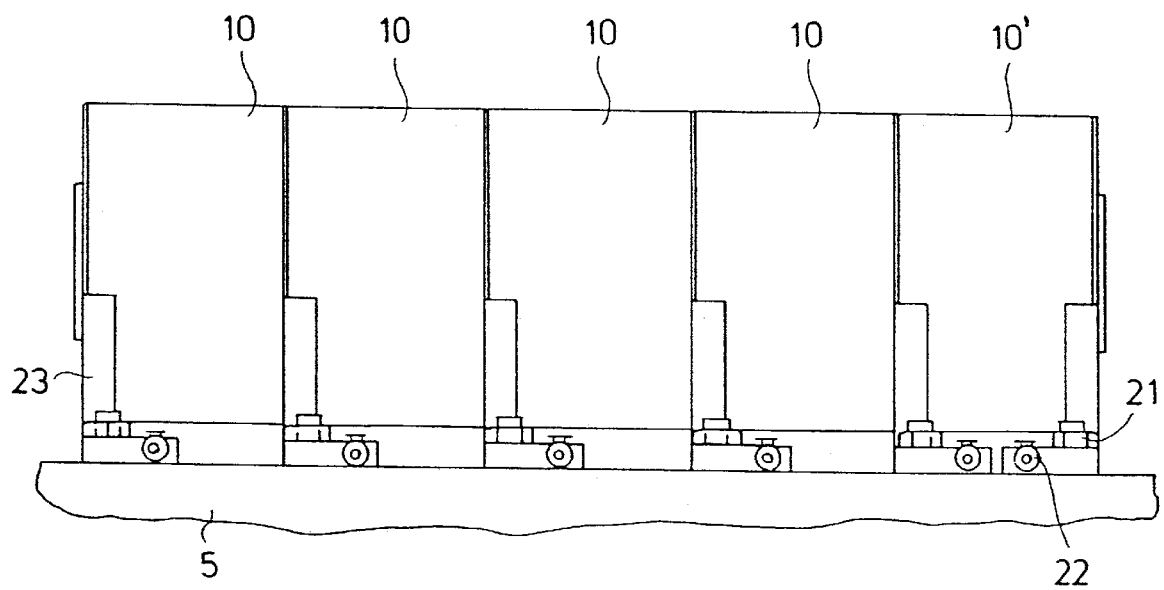
FIG. 1 shows a side view of a segmented roll according to the invention.

Referring to FIG. 1, the segmented roll schematically illustrated therein comprises five roll segments 10 in an end-to-end succession, whereby the first four of the roll segments are mounted by their one ends via a support member 23 on a mounting frame 5, while their other ends are supported on the end surface of the respective adjacent roll segment 10. The last roll segment 10' of the row of roll segments has both of its ends mounted on the mounting frame 5. Each of the roll segments 10 has a nonrotating support shaft of its own, on which it is adapted to rotate on bearings. The coupling between two adjacent roll segments 10 is adapted to permit a limited angle of inclination between the end-to-end adjacent roll segments 10. The mounting of the roll segments 10 on the mounting frame 5 is made such that allows the position of any single roll segment 10 to be adjusted both in regard to its height as well as its lateral disposition thus making it possible to adjust the bow of the segmented roll in an uncomplicated manner.

Figure 2:
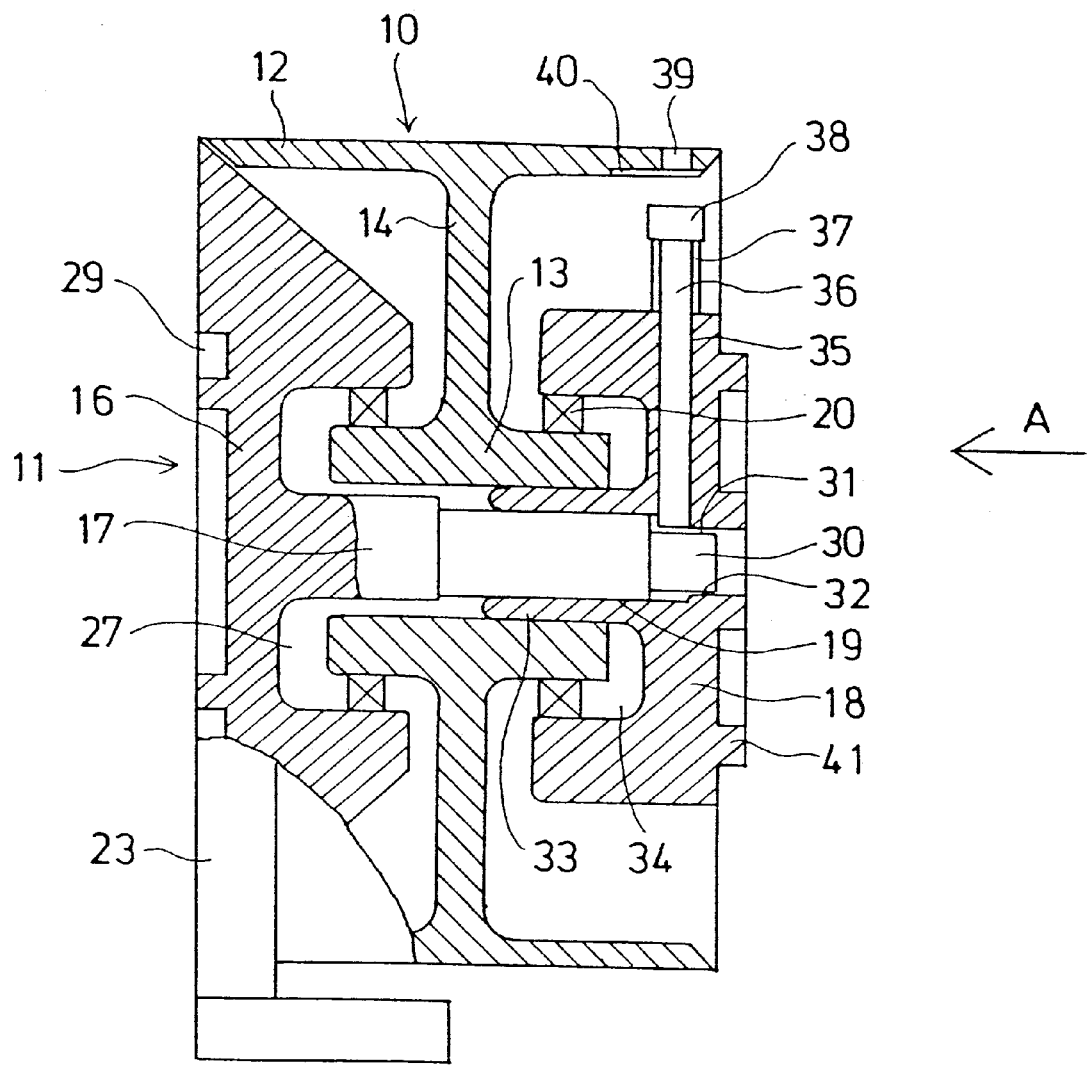
FIG. 2 shows a partially cross-sectional side view of one roll segment of the segmented roll.
Figure 3:
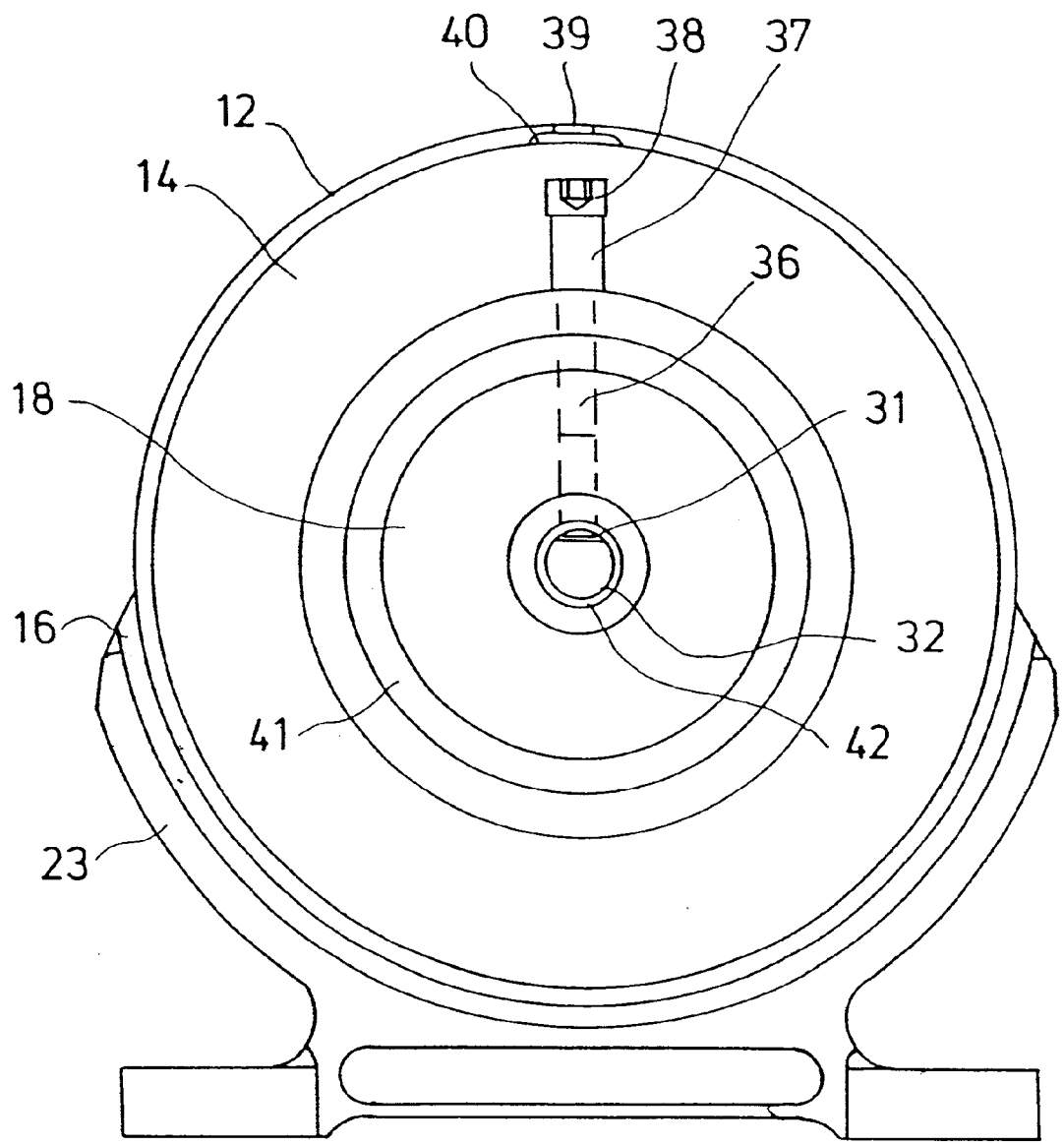
FIG. 3 shows the roll segment of FIG. 2 as seen from the direction of arrow A.

In the following, the structure of a single roll segment 10 is described by making reference to FIGS. 2 and 3. The discussion relates to any of the intermediate roll segments illustrated in FIG. 1. The structure of the roll end segment differs from that of the intermediate roll segments only therein that the roll end segment has both of its ends equipped with a support member 23 (see FIG. 4).

Each roll segment 10 is comprised of two concentric cylindrical shell parts 12 and 13 connected to each other by a disc portion 14 situated in the central symmetry plane of the cylindrical shell parts. The roll segment 10 is advantageously made by casting. In the roll segment, the outer cylindrical part 12 forms the shell proper that in a segmented roll serving as a spreader roll advantageously has a grooved outer surface. In the axial direction, the inner cylindrical shell part 13 has a length shorter than that of the outer shell part 12 and has the support shaft 11 of the roll segment adapted to pass therethrough.

The support shaft 11 of the roll segment is formed by two flange-like parts that are later in the text denoted as an intermediate support member 16 and an intermediate connection member 18. These members 16 and 18 are adapted into the interior space of the roll segment 10 so that the surfaces of the intermediate support member 16 and the intermediate connection member 18 directed axially outward from the center of the roll segment 10 serve as the end surfaces of the roll segment 10 and, additionally, as the mating surfaces in the coupling between two adjacent roll segments. The two parts of the support shaft 11 are connected to each other by a stub shaft 17 that is incorporated in the intermediate support member 16 and has a length extending through the inner shell 13 of the roll segment into the center bore 19 of the intermediate connection member 18. In the normal position of the assembly serving the operation of the segmented roll, the support shaft members 16 and 18 are locked to each other nonrotatingly by means of a lock screw 36.

The intermediate support member 16 is mounted on the mounting frame 5 of the segmented roll via a support member 23 which may be separate from or integral with the intermediate support member 16. In FIG. 1 are schematically shown the fastening and adjustment means 21, 22 associated with the support member 23, advantageously implemented by means of adjustment screws that facilitate the position adjustment of the intermediate support member 16 both vertically and laterally in regard to the segmented roll mounting frame 5. This arrangement permits the bow of the segmented roll to be controlled by adjusting the position of any roll segment 10 separately in regard to its adjacent roll segments.

A stub shaft 17 having an annular recess 27 surrounding its base projects from the center of the disc-like portion of the intermediate support member 16 in the direction of the interior space of the roll segment 10. This recess serves to accommodate the tubular flange part of the inner shell 13 of the roll segment 10 projecting toward the intermediate support member 16. In the axial direction, the stub shaft 17 extends through the bore of the inner shell 13 of the roll segment 10 close to the other end of the roll segment 10. The outer end of the stub shaft 17 has a portion 30 with male thread 32 and there is a flattened area 31 arranged in the perimeter of said threaded portion (see FIG. 3).

The intermediate connection member 18 located on the other side of the roll segment 10 functions as a mating member to the intermediate support member 16 so that said members 16, 18 together form a support shaft 11 of the roll segment 10. Also the intermediate connection member 18 is shaped into a disc-like piece having a sleeve portion 33 projecting from its center toward the interior space of the roll segment. The sleeve portion 33 has an annular recess 34 made at its base serving to accommodate the tubular flange part of the inner shell 13 of the roll segment 10 projecting toward the intermediate connection member 18. The axial bore 19 of the sleeve portion 33 extends through the entire length of the intermediate connection part 18 up to the terminal end of the sleeve portion. Both the stub shaft 17 of the intermediate support member 16 and the sleeve portion 33 of the intermediate connection member 18 have an outer diameter slightly smaller than the inner diameter of the inner shell 13 of the roll segment 10, thus avoiding any direct contact between the inner shell 13 with the parts 17 and 33 of the support shaft 11 passing therethrough.

From the outer perimeter of the intermediate connection member 18 inward is drilled an inner-threaded hole 35 reaching radially perpendicular to the longitudinal axis of the roll segment 10 up to the bore 19 drilled axially through the intermediate connection member 18. Into this threaded hole 35 is placed a lock screw 36 acting as a locking means that has two functional positions. In the first position of the screw 36, its tip that is directed toward the longitudinal axis of the roll segment is driven tightly against the flat area 31 on the periphery of the terminal end 30 of the stub shaft 17. Then, the screw 36 serves to lock the intermediate connection member 18 solidly to the stationary intermediate support member 16 so as to prevent rotation of the intermediate connection member 18. To prevent unintentional excessive tightening of the screw 36 against the flat area 31 of the stub shaft 17, the cap end of the lock screw 36 that is directed radially outward from the stub shaft is provided with a bushing 37 adapted to meet the perimeter of the intermediate connecting member 18 about the hole 35 when the tip of the lock screw 36 is compressed against the flat area 31 of the stub shaft 17. Advantageously, the perimeter of the intermediate connection member 18 can be machined to have a partially flat key area (not shown) extending about the hole 35, whereby the bushing 37 can evenly rest on said flat key area.

At least that portion of the axial bore 19 of the intermediate connection member 18 which extends from the hole 35 up to the outer end surface of the intermediate connection member 18 is provided with an inner thread 42 compatible with the outer thread 32 of the terminal end 30 of the stub shaft 17 of the intermediate support member 16.

The roll segment 10 is rotatingly mounted on two ball bearings 20 running on the support shaft 11 formed by the intermediate support member 16 and the intermediate connection member 18. The bearings are adapted to both sides of the disc portion 14 of the roll segment 10, on the outer surface of the inner shell 13 so that the inner races of the bearings 20 rotate with the inner shell 13. The inner shell 13 is formed by two tubular flange parts which extend to both sides from the disc portion 14 and are enclosed by an annular recess 27 on the side facing the intermediate support member 16 and by a respective annular recess 34 on the side facing the intermediate connection member 18. The stationary outer races of the bearings 20 are then supported on the inner surfaces of the outer walls of these two annular recesses 27 and 34.

As noted above, the inner surface of the inner shell 13 of the roll segment 10 has no direct contact with the members 17, 19 of the support shaft 11 passing through the bore of the roll segment's inner shell 13. Hence, the bearings 20 are the only point at which the roll segment 10 is connected to the support shaft 11. The chief function of the stub shaft 17 of the intermediate support member 16 together with the sleeve portion 33 of the intermediate connection member 18 fitted into the central bore of the inner shell 13 is to form the coupling elements for connecting the support shaft members 16 and 18 to each other.

Figure 4:
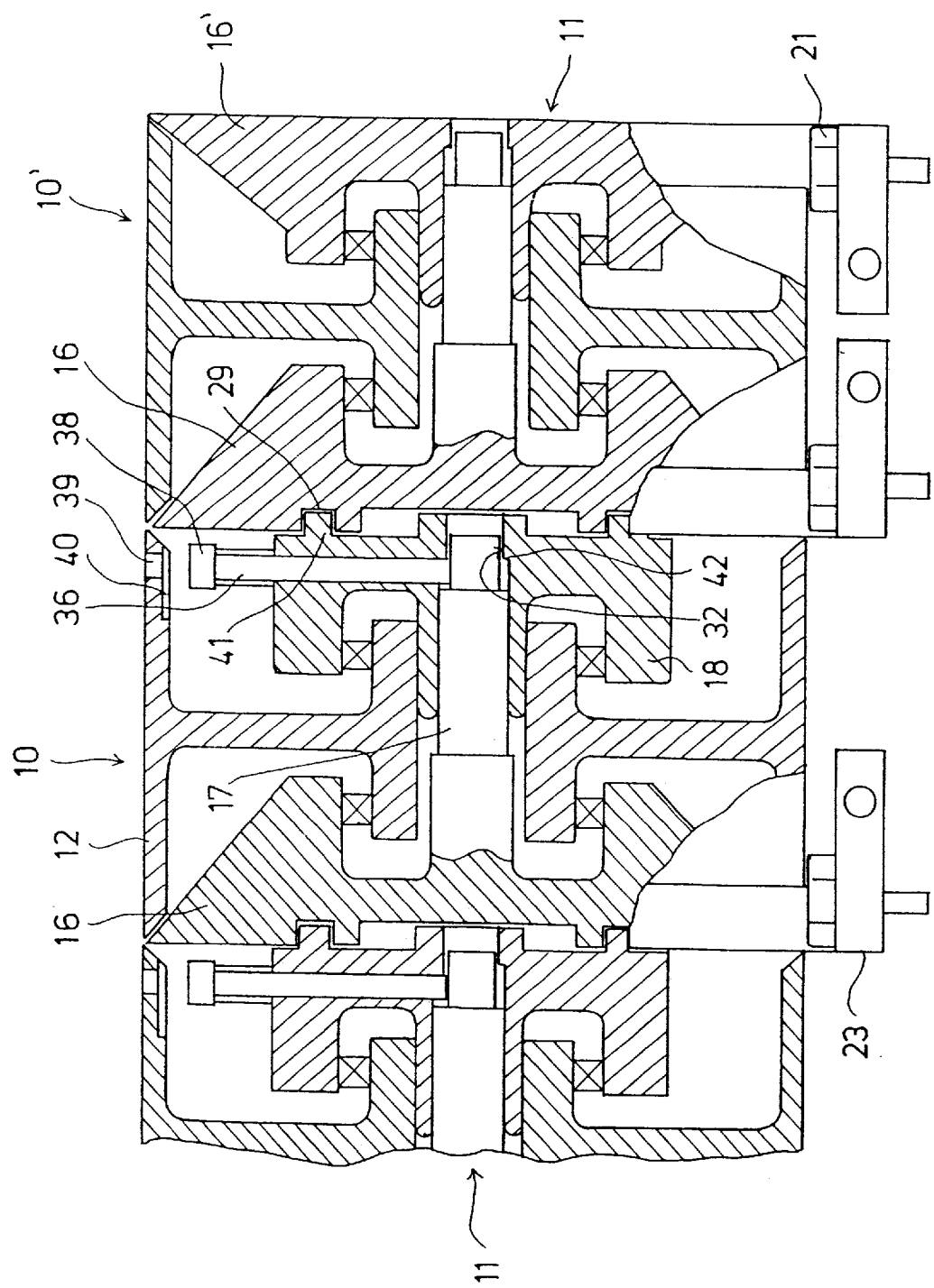
FIG. 4 shows in a partially cross-sectional side view the coupling between two adjacent roll segments of the segmented roll and the structure of the roll end segment.

In FIG. 4 is shown the structure of the last roll segment 10'. As the last roll segment 10' needs to be supported at its both ends to the mounting frame, its support shaft 11' is comprised of the above-described standard-type intermediate support member 16 connected to an end support member 16', whose structure combines certain characteristic details of the standard-type intermediate support member 16 and those of the intermediate connection member 18.

The coupling means for connecting two adjacent roll segments 10 to each other are formed on the end surfaces of the support shaft 11 of the roll segment. As can be seen from FIG. 2 illustrating the roll segment 10, the outer surface of the intermediate connection member 18 has an annular flange projection 41 made thereon, while the outer surface of the intermediate support member 16 has an annular groove 29 made thereon with a shape essentially concentrically compatible with that of the annular flange projection 41.

In the following, the coupling formed between adjacent roll segments 10 and the removal of a single roll segment from the central area of the segmented roll is described by making reference to FIG. 4, as well as to FIG. 2 for details related to the structure of the roll segment 10.

Accordingly, the universal joint between two adjacent roll segments 10 is formed between the end surfaces of the first roll segment's intermediate connection member 18 and the second roll segment's intermediate support member 16. When two roll segments 10 are aligned end-to-end abutting each other, the annular flange projection 41 made to the end surface of the first roll segment's intermediate connection member 18 enters the annular recess 29 made to the end surface of the second roll segment's intermediate support member 16, wherein it can rotate and tilt within the limits provided by a suitably arranged play. The maximum inclination can be increased by proper beveling of the edges of the annular flange projection 41 and the annular recess 29.

By virtue of arranging the bowing point of two adjacent roll segments 10 to coincide in the above-described manner with the mating surface of the roll segments 10, the segmented roll can bow without any jaggedness between two adjacent roll segments 10.

To remove a roll segment 10 from the central area of the segmented roll according to the invention, the first step comprises unscrewing the lock screw 36 of the support shaft 11 that fixes nonrotatingly the intermediate connection member 18 to the intermediate support member 16 of the roll segment. To facilitate unscrewing the lock screw 36 from outside the roll segment, the outer shell 12 of the roll segment is provided with an opening 39 drilled in a position coinciding with the head of the lock screw 36 and having a recess 40 made about said opening on the inner surface of the outer shell 12 of the roll segment (see FIG. 3). Then, the unscrewing of the screw 36 can be performed by inserting through the opening 39 a tool by means of which the lock screw 36 is rotated until the head 38 of the lock screw meets the recess 40 made to the inner surface of the roll segment's outer shell 12. By this time, the tip of the lock screw 36 has been released from the contact with the stub shaft 17 of the intermediate support member 16 and the head of the lock screw 36 has locked intermediate connection member 18 to rotate with the outer shell 12. Now the roll segment 10 can be rotated in a proper direction by a suitable number of turns depending on the pitch of the threads 32, 42 so that the intermediate connection member 18 rotates with the roll segment 10. Thereby, the cooperation of the outer thread 32 made on the terminal end of the stub shaft 17 and the inner thread 42 made into the center bore 19 of the intermediate connection member 18 force the intermediate connection member 18 to move supported by the stub shaft 17 toward the intermediate support member 16. This movement causes the annular flange projection 41 of the end surface of the intermediate connection member 18 to withdraw from the annular recess 29 of the end surface of the adjacent roll segment thus disengaging the roll segment 10 from the connection with the adjacent roll segment.

The above-described steps must be repeated for the roll segment adjoining the other end of the roll segment 10 to be removed, whereafter the support member 23 of the roll segment 10 can be dismounted from the mounting frame and the roll segment 10 removed from its place. The reassembly of the roll segment back to the row of adjacent roll segments takes place in a reversed order.

Figure 5:
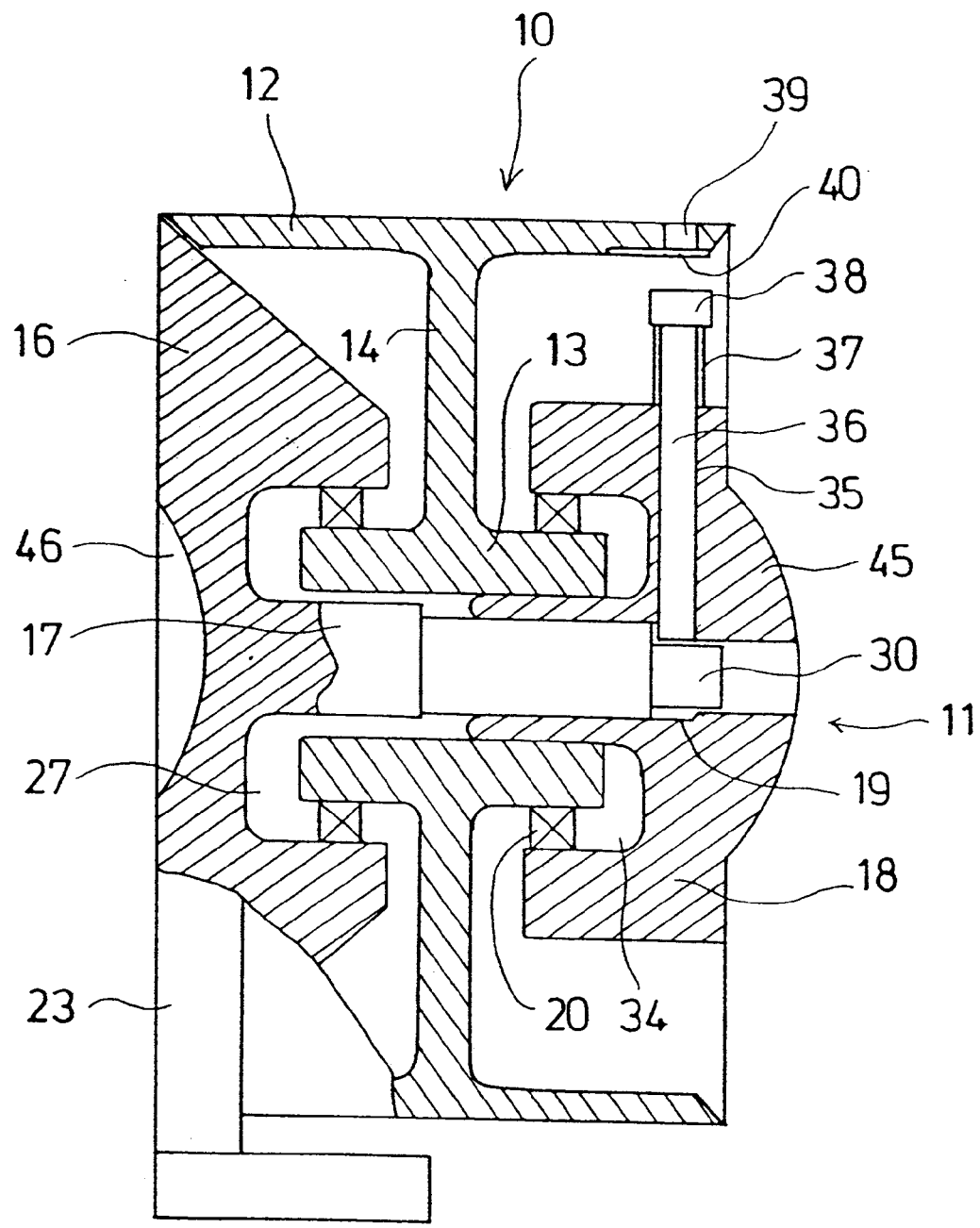
FIG. 5 shows another embodiment of the roll segment suited for use in a segmented roll according to the invention.

In FIG. 5 is shown another embodiment of the roll segment suitable for use in a segmented roll and particularly the connection members of the roll segment. The structure of the roll segment is chiefly identical to that of the roll segment shown in FIG. 2. The connection members comprise a projection 45 formed by a convex hemispherical surface on the end surface of the intermediate connection member 18 and, on the end surface of the intermediate support member 16, a recess 46 having the shape of a concave hemispherical surface which is essentially concentric and of equal radius of curvature with that of the mating end surface formed by the projection 45. Then, engaging two roll segments of the kind shown in FIG. 5 into an intimate connection with each other forms a universal joint surface between the projection 45 and the recess 46 that allows different angles of inclination between the axes of the adjacent roll segments. This kind of support joint between the two adjacent roll segments can be disassembled by way of moving the intermediate support member 16 and the intermediate coupling member in the manner described in conjunction with the former exemplifying embodiment.

Also other implementations of the segmented roll structure according to the invention can be contemplated. Advantageously, the coupling elements at the end surfaces of the roll segments are concentric members, whereby the release of the support joint between the adjacent roll segments can be arranged to take place by rotation. The coupling member may be, e.g., a threaded bushing attached to the end of the intermediate support member stub shaft and arranged to fit into a recess made to the end surface of the adjacent roll segment when the roll segments are in their coupled position. Then, the entire body of the intermediate support member need not necessarily be movable toward the support member of the roll segment, but instead, the contraction of the support shaft length can be simply accomplished by rotating the threaded bushing along the roll segment support shaft toward the support member.

I claim:

1. A segmented roll comprised of a plurality of end-to-end mounted roll segments, each mounted to rotate on bearings supported on a separate support shaft, and wherein each roll segment has coupling means on first and second axial end surfaces of the support shafts of the roll segments, said coupling means serving to disengageably connect two adjacent roll segments to each other, and wherein the support shaft is comprised of at least two parts whose mutual disposition is alterable for the purpose of altering the axial length of the support shaft.

2. The segmented roll of claim 1 wherein the coupling means at the first and second end surfaces of the support shaft of said roll segments comprise:

a projection on the first end surface of a first roll segment; and a mating recess on the second end surface of a second roll segment which faces said projection on said first roll segment.

3. The segmented roll of claim 2 wherein the first end surface of the first roll segment has an annular flange projection on the end surface of the support shaft of the first roll segment, and the second end surface of the second roll segment has an annular recess, said annular flange projection and said annular recess being essentially concentric and having a shape and dimensions to permit limited rotation and inclination of the annular flange projection in the concentric annular recess when the adjacent roll segments are coupled to each other.

4. The segmented roll of claim 2 wherein the first end surface of the first roll segment has a convex hemispherical projection and the second end surface of the second roll segment has a concave hemispherical recess facing the first roll segment, said projection and said recess being essentially concentric and having an essentially equal radius of curvature.

5. The segmented roll of claim 1 wherein the support shaft of the roll segments is comprised of two parts adapted to be solidly lockable to each other with the help of a locking element and to be, after the locking element is released, axially movable with respect to each other by a distance allowing the coupling means formed on the mating end surfaces of two abutting roll segments to be withdrawn apart from each other.

6. The segmented roll of claim 5 wherein the two parts of the support shaft comprise a first part and a second part, and wherein the first part of the support shaft of said roll segments includes an axial projection which is adapted to fit into an axial bore of the second part of the support shaft and the locking element is a lock screw or similar fastening member placed into a radial hole formed in the second part of the support shaft, the locking element having a tip which in its locking position is adapted to press against an outer circumference of the axial projection of the support shaft, thus solidly locking both parts of the support shaft to each other.

7. The segmented roll of claim 6 wherein the lock screw or similar locking element has a screw head and is movable from its locking position into another functional position in which the tip of the lock screw is withdrawn from resting against the outer circumference of the axial projection so that the screw head will tuck against the inner circumference of a shell of the roll segment, thus coupling the second part of the support shaft to follow a possible movement of the roll segment.

8. The segmented roll of claim 7 wherein an inner circumference of the roll segments is provided with a recess suitable for assuring positive contact of the lock screw head in the second functional position of the lock screw with the shell of the roll segment when the roll segment is being rotated.

9. The segmented roll of claim 6 wherein at least a portion of the axial projection of the first part of the support shaft of the roll segments is provided with an outer thread and at least a portion of the axial bore of the second part of the support shaft is provided with a mating inner thread, whereby after the disengagement of the locking element connecting said parts of the support shaft, rotation of one part of the support shaft forces said part to move axially in regard to said first part of the support shaft.

10. The segmented roll of claim 1, wherein said roll segments further comprise:
   an outer shell;
   a disc portion extending radially inwardly from the outer shell;
   an inner shell connected to the disc portion, and thus to the outer shell, the inner shell having a tubular flange portion extending to each side of the disc portion; and
   wherein both parts of the support shaft are provided with an annular recess opening toward an interior of the roll segment, said annular recesses being adapted to accommodate the tubular flange parts of the inner shell, wherein each roll segment is rotatably mounted on the support shaft by two bearings whose inner races are fixed to the rotating inner shell of the roll segment and outer races are fixed to inner surfaces of outer walls of the annular recesses.

11. The segmented roll of claim 1, wherein the support shaft of each roll segment is connected at least by its one end to a roll segment mounting frame by support means allowing the adjustment of the position and/or distance of support points of the individual roll segments in regard to their mounting frame.

12. A segmented roll comprising:
   a first roll segment having an outer cylindrical shell part having first axial length;
   a first support shaft having a first part and a second part,
   wherein the combined axial length of the first support shaft first part and the first support shaft second part is substantially the same as the first axial length, and wherein the disposition of the first part is alterable with respect to the second part to alter the axial length of the first support shaft;
   bearings positioned on the first support shaft, wherein the first roll segment is mounted by the bearings to the first support shaft;
   an intermediate support member extending from the first support shaft first part, and having an axial end surface; and
   an intermediate connection member extending from the first support shaft second part and having an axial end surface, wherein the intermediate connection member end surface is disengageably coupled to the intermediate support member end face of a second like roll segment to permit the first and second roll segments to be disengaged from one another.

13. A segmented roll comprising
   a first roll segment having an outer cylindrical shell part;
   a first support shaft having a first part and a second part, wherein the disposition of the first part is alterable with respect to the second part to alter the axial length of the first support shaft,
   bearings positioned on the first support shaft, wherein the first roll segment is mounted by the bearings to the first support shaft;
   an intermediate support member extending from the first support shaft first part, and having an axial end surface; and
   an intermediate connection member extending from the first support shaft second part and having an axial end surface, wherein the intermediate connection member end surface is disengageably coupled to the intermediate support member end face of a second like roll segment to permit the first and second roll segments to be disengaged from one another, wherein the intermediate connection member has a projection, and the intermediate support member has portions defining a mating recess which faces a projection on a like second roll segment.

14. The segmented roll of claim 13 wherein the intermediate connection member has an annular flange projection, and the intermediate support member has an annular recess, said annular flange projection and said annular recess being essentially concentric and having a shape and dimensions to permit limited rotation and inclination of the annular flange projection of one roll segment in the concentric annular recess of an adjacent roll segment when coupled together.

15. The segmented roll of claim 13 wherein the intermediate connection member has a convex hemispherical projection and the intermediate support member has a concave hemispherical recess, said projection and said recess being essentially concentric and having an essentially equal radius of curvature.

16. A segmented roll comprising
   a first roll segment having an outer cylindrical shell part;
   a first support shaft having a first part and a second part, wherein the disposition of the first part is alterable with respect to the second part to alter the axial length of the first support shaft,
   bearings positioned on the first support shaft, wherein the first roll segment is mounted by the bearings to the first support shaft;
   an intermediate support member extending from the first support shaft first part, and having an axial end surface; and
   an intermediate connection member extending from the first support shaft second part and having an axial end surface, wherein the intermediate connection member end surface is disengageably coupled to the intermediate support member end face of a second like roll segment to permit the first and second roll segments to be disengaged from one another, wherein a locking element extends between the first support shaft first part and second part to solidly lock the first part to the second part, the locking element being releasable to permit axial movement of the first part with respect to the second part a distance allowing the intermediate connection member on the first roll segment to be withdrawn from the intermediate support member on the second roll segment.

17. The segmented roll of claim 16 wherein the first part of the first roll segment first support shaft has an axial projection, which fits into an axial bore defined by portions of the second part of the first support shaft, and wherein the locking element is a lock screw which extends into a radial hole formed in the second part of the support shaft, the lock screw having a tip which in a locking position presses against an outer circumference of the axial projection of the support shaft, thus solidly locking both parts of the first support shaft to each other.

18. The segmented roll of claim 17 wherein the lock screw has a screw head and is movable from the locking position into another functional position in which the tip of the lock screw is withdrawn from resting against the outer circumference of the axial projection so that the screw head will tuck against the inner circumference of a shell of the roll segment, thus coupling the second part of the support shaft to follow a movement of the roll segment.

19. The segmented roll of claim 18 wherein an inner circumference of the first roll segment is provided with a recess which receives the lock screw head in a positive contact in the second functional position of the lock screw with the shell of the roll segment when the roll segment is being rotated.

20. The segmented roll of claim 17 wherein at least a portion of the axial projection of the first part of the support shaft of the first roll segment is provided with an outer thread and at least a portion of the axial bore of the second part of the first support shaft is provided with a mating inner thread, whereby after the disengagement of the locking element connecting said parts of the first support shaft, rotation of one part of the first support shaft forces said part to move axially in regard to the other part of the first support shaft.

21. A segmented roll comprising:
a first roll segment having an outer cylindrical shell part;
a first support shaft having a first part and a second part, wherein the disposition of the first alterable with respect to the second part to alter the axial length of the first support shaft,
bearings positioned on the first support shaft, wherein the first roll segment is mounted by the bearings to the first support shaft;
an intermediate support member extending from the first support shaft first part, and having an axial end surface; and
an intermediate connection member extending from the first support shaft second part and having an axial end surface, wherein the intermediate connection member end surface is disengageably coupled to the intermediate support member end face of a second like roll segment to permit the first and second roll segments to be disengaged from one another, wherein the first roll segment further comprises:
an outer shell;
a disc portion extending radially inwardly from the outer shell;
an inner shell connected to the disc portion, and thus to the outer shell, the inner shell having a tubular flange portion extending to each side of the disc portion; and
wherein both parts of the first support shaft are provided with an annular recess opening toward an interior of the roll segment, said annular recesses being adapted to accommodate the tubular flange parts of the inner shell, wherein each roll segment is rotatably mounted on the first support shaft by two bearings having inner races which are fixed to the rotating inner shell of the first roll segment and outer races are fixed to inner surfaces of outer walls of the annular recesses.

22. A segmented roll comprising
a first roll segment having an outer cylindrical shell part;
a first support shaft having a first part and a second part, wherein the disposition of the first part is alterable with respect to the second part to alter the axial length of the first support shaft,
bearings positioned on the first support shaft, wherein the first roll segment is mounted by the bearings to the first support shaft;
an intermediate support member extending from the first support shaft first part, and having an axial end surface; and
an intermediate connection member extending from the first support shaft second part and having an axial end surface, wherein the intermediate connection member end surface is disengageably coupled to the intermediate support member end face of a second like roll segment to permit the first and second roll segments to be engaged from one another, wherein the first support shaft of the first roll segment is connected at least by one end to a roll segment mounting frame by support means allowing the adjustment of the position and/or distance of support points of the first roll segment in regard to the mounting frame.

23. A segmented roll comprising:
a first roll segment having an outer cylindrical shell part;
a first support shaft having a first part and a second part, wherein the first part engages with the second part within the first roll segment outer cylindrical shell part, and wherein the disposition of the first part is alterable with respect to the second part to alter the axial length of the first support shaft;
bearings positioned on the first support shaft, wherein the first roll segment is mounted by the beings to the first support shaft;
an intermediate support member extending from the first support shaft first part, and having an axial end surface; and
an intermediate connection member extending from the first support shaft second part and having an axial end surface, wherein the intermediate connection member end surface is disengageably coupled to the intermediate support member end face of a second like roll segment to permit the first and second roll segments to be disengaged from one another.

* * * * *

UNITED STATES PATENT AND TRADEMARK OFFICE
CERTIFICATE OF CORRECTION

PATENT NO. : 6,723,032 B2
DATED : April 20, 2004
INVENTOR(S) : Pekka Eronen

It is certified that error appears in the above-identified patent and that said Letters Patent is hereby corrected as shown below:

Column 8,
Line 52, "a lock screw or similar fastening" should be -- a fastening --
Lines 59-60, "lock screw or similar locking element" should be -- fastening member --
Line 62, "lock screw" should be -- fastening member --

Column 9,
Line 3, "the lock screw" should be -- the screw --
Line 4, "lock screw" should be -- fastening member --
Line 36, "and/or" should be -- or --
Line 60, "second like roll" should be -- second roll --

Column 10,
Line 18, "a like second" should be -- a second --
Line 51, "second like roll" should be -- second roll --

Column 11,
Line 45, "second like roll" should be -- second roll --

Column 12,
Line 26, "second like roll" should be -- second roll --
Line 28, "engaged" should be -- disengaged --
Line 31, "and/or" should be -- or --
Line 53, "second like roll" should be -- second roll --

Signed and Sealed this

Nineteenth Day of April, 2005

JON W. DUDAS
*Director of the United States Patent and Trademark Office*